(12) United States Patent
Malinovskiy et al.

(10) Patent No.: US 12,553,761 B2
(45) Date of Patent: Feb. 17, 2026

(54) FMCW-BASED DISTANCE MEASURING DEVICE

(71) Applicant: Endress+Hauser SE+Co. KG, Maulburg (DE)

(72) Inventors: Alexey Malinovskiy, Maulburg (DE); Stefan Gorenflo, Hausen (DE); Harald Faber, Lörrach (DE); Markus Vogel, Schopfheim (DE); Ghislain Daufeld, Village Neuf (FR)

(73) Assignee: Endress+Hauser SE+Co. KG, Maulburg (DE)

( * ) Notice: Subject to any disclaimer, the term of this patent is extended or adjusted under 35 U.S.C. 154(b) by 353 days.

(21) Appl. No.: 17/756,440

(22) PCT Filed: Nov. 9, 2020

(86) PCT No.: PCT/EP2020/081439
§ 371 (c)(1),
(2) Date: May 25, 2022

(87) PCT Pub. No.: WO2021/104839
PCT Pub. Date: Jun. 3, 2021

(65) Prior Publication Data
US 2023/0003570 A1 Jan. 5, 2023

(30) Foreign Application Priority Data
Nov. 27, 2019 (DE) ...................... 10 2019 132 149.2

(51) Int. Cl.
*G01S 7/35* (2006.01)
*G01F 23/284* (2006.01)
*G01S 13/34* (2006.01)

(52) U.S. Cl.
CPC ............ *G01F 23/284* (2013.01); *G01S 7/354* (2013.01); *G01S 13/343* (2013.01); *G01S 13/345* (2013.01)

(58) Field of Classification Search
None
See application file for complete search history.

(56) References Cited

U.S. PATENT DOCUMENTS 5,341,141 A * 8/1994 Frazier ................... G01S 13/89
342/179
7,010,286 B2 * 3/2006 Sorrells ................... H04B 1/16
455/313

(Continued)

FOREIGN PATENT DOCUMENTS

CN 108801398 A 11/2018
DE 102007046566 A1 * 5/2008 ............ G01S 7/034

(Continued)

OTHER PUBLICATIONS

Gonzalez, Maria C., Improving Range Determination by Digital Filtering of FMCW Radar, IEEE, 978-1-4799-3678-6/14, 4 pp.

*Primary Examiner* — Robert W Hodge
(74) *Attorney, Agent, or Firm* — Mark A. Logan; Endress+Hauser (USA) Holding, Inc.

(57) ABSTRACT

An FMCW-radar based distance measuring device is characterized in that, in addition to analogue high-pass and low-pass filtering, the evaluation signal typical for FMCW additionally undergoes subsequent digital filtering. In this case, the analogue/digital conversion takes place by oversampling. As a result, according to the invention, all those frequencies in the evaluation signal that are above or below the frequency corresponding to the distance of the object are effectively suppressed. At the same time, the analogue filters can be constructed with a very low level of complexity. The space requirement and the costs of the analogue components (Continued)

is reduced thereby. In addition, the dependence on temperature of the distance measuring device is reduced thereby. The potentially high distance resolution is also maintained.

9 Claims, 4 Drawing Sheets

(56) References Cited

U.S. PATENT DOCUMENTS

| | | | | |
|---|---|---|---|---|
| 8,314,732 | B2* | 11/2012 | Oswald | G01S 7/2926 |
| | | | | 342/195 |
| 10,382,087 | B1* | 8/2019 | Dror | H04B 1/525 |
| 2016/0322982 | A1* | 11/2016 | Pagnanelli | H03M 3/38 |
| 2017/0016754 | A1* | 1/2017 | Fischer | G01S 7/354 |
| 2017/0212214 | A1* | 7/2017 | Murali | G01S 13/931 |
| 2017/0212234 | A1* | 7/2017 | Heath | G01S 13/08 |
| 2018/0011180 | A1* | 1/2018 | Warnick | H01Q 21/064 |
| 2018/0164145 | A1* | 6/2018 | Daufeld | G01F 25/20 |
| 2018/0183471 | A1 | 6/2018 | Lin | |
| 2018/0306913 | A1* | 10/2018 | Bartels | G01S 17/74 |
| 2019/0130942 | A1* | 5/2019 | Hormati | H03L 7/081 |
| 2019/0219436 | A1* | 7/2019 | Schmits | G01F 23/284 |

FOREIGN PATENT DOCUMENTS

| | | |
|---|---|---|
| DE | 102009002785 A1 | 11/2010 |
| DE | 102011007372 A1 | 10/2012 |
| DE | 102017119063 A1 | 3/2018 |
| DE | 102017130728 A1 | 6/2019 |
| EP | 2631666 A1 | 8/2013 |
| EP | 3339881 A1 | 6/2018 |
| EP | 3126795 B1 | 1/2019 |
| WO | 2008094172 A2 | 8/2008 |

* cited by examiner

FMCW-BASED DISTANCE MEASURING DEVICE

CROSS-REFERENCE TO RELATED APPLICATIONS

The present application is related to and claims the priority benefit of DPMA Patent Application No. 10 2019 132 149.2, filed on Nov. 27, 2019, and International Patent Application No. PCT/EP2020/081439, filed on Nov. 9, 2020, the entire contents of which are incorporated herein by reference.

TECHNICAL FIELD

The invention relates to an FMCW-based distance measuring device.

BACKGROUND

In automation technology, especially for process automation, field devices are often used, which serve to detect various measured variables. The measured variable to be determined can, for example, be a fill-level, a flow, a pressure, the temperature, the pH, the redox potential, a conductivity, or the dielectric value of a medium in a process plant. To detect the corresponding measured values, the field devices each comprise suitable sensors or are based upon suitable measuring principles. A number of different field device types are manufactured and sold by the Endress+Hauser group of companies.

For measuring the fill-level of filling materials in containers, radar-based measuring methods have become established, since they are robust and require minimum maintenance. The term, "container," within the scope of the invention, is also understood to mean non-closed containers, such as, for example, basins, lakes, or flowing bodies of water. A key advantage of radar-based measuring methods lies in their ability to measure the fill-level quasi-continuously. In the context of this patent application, the term, "radar," refers to microwave signals having frequencies between 0.03 GHz and 300 GHz. Typical frequency bands in which fill-level measurement or distance measurement is generally performed are 2 GHz, 6 GHz, 26 GHz, or 79 GHz. The higher the selected frequency band, the narrower the beam cone in which the microwave signal is radiated or the smaller the antenna can be.

In the case of radar-based fill-level measurement, FMCW ("Frequency Modulated Continuous Wave") forms an established measurement principle. The measurement principle is based upon emitting a continuous radar signal with modulated frequency. In this case, the frequency of the radar signal lies within a defined frequency band in the range of a standardized center frequency. Characteristic of FMCW is here that the transmission frequency is not constant, but changes periodically within the defined frequency band. At a center frequency of 79 GHz, the frequency band is, for example, 2 GHz, i.e., from 78 GHz to 80 GHz. With FMCW as well, the emission and reception of the microwave signals is divided into successive measuring cycles.

The change in frequency over time is linear by default for FMCW, and has a sawtooth or triangular shape. A sinusoidal change can, in principle, also be implemented. When the FMCW method is implemented, the distance from the filling material or the fill-level is then determined on the basis of the instantaneous frequency difference between the currently-received radar signal and the instantaneously-emitted radar signal, by generating a corresponding evaluation signal by mixing the corresponding radio-frequency electrical signals. The distance can be determined on the basis of the frequency of the evaluation signal, since the frequency of the evaluation signal changes in proportion to the distance. The measuring principle of FMCW is described in more detail in "Radar Level Detection, Peter Devine, 2000," for example.

Conventionally, the evaluation signal is then digitized by means of an analog/digital converter in order to be able to perform a Fourier transform of the evaluation signal for frequency determination. For this purpose, the evaluation signal must in practice be low-pass-filtered in order to remove radio-frequency interference components in the evaluation signal. In this case, low-pass filtering takes place before digitization of the evaluation signal in order to prevent aliasing effects during digitization.

Analogous filters with sufficient filter sharpness must be designed with a correspondingly high order, i.e., with a corresponding number of capacitive or inductive components. As a result, however, the implementation of analog filters is very cost-intensive. In addition, the robustness of the filter is reduced, for example, with respect to component tolerances and temperature influences, as the number of capacitive or inductive components increases. This in turn reduces the potential accuracy of the distance measurement. However, a very high level of accuracy is required, especially for fill-level measurement, at least in the case of tank gauging.

The invention is therefore based upon the aim of developing a cost-effective and robust fill-level measuring device which reaches a high level of accuracy.

SUMMARY

The invention achieves this aim by means of an FMCW radar-based distance measuring device, which serves to measure a distance from an object. The distance measuring device according to the invention comprises at least:
  a signal-generating unit, which is designed
    to generate a radio-frequency electrical signal according to the FMCW principle, and
    to generate an evaluation signal by mixing the radio-frequency signal with a received signal,
  an antenna arrangement, by means of which the radio-frequency signal can be emitted as a radar signal in the direction of the object and can be received as a corresponding received signal after reflection on the object,
  a first analog signal-processing unit for processing the evaluation signal, having, each arranged in series,
    a first analog high-pass filter,
    a first amplifier, and
    a first analog low-pass filter,
  a digital evaluation unit for processing the evaluation signal, wherein the digital evaluation unit is arranged downstream of the analog evaluation unit, having
    a first analog/digital converter, which is designed to digitize the evaluation signal, processed by the analog signal-processing unit, by means of oversampling,
    a first digital low-pass filter for filtering the evaluation signal,
    optionally, a first decimator for decimation of the digitized evaluation signal,
    a first digital high-pass filter for filtering the optionally decimated evaluation signal, a computing unit which is designed to determine the distance on the basis of the digitally filtered evaluation signal, especially by means of a Fourier transform.

The distance measuring device according to the invention is therefore based upon the concept of performing not only analog filtering, but also digital filtering of the evaluation signal. The advantage of additional digital filtering is that the complexity of the analog signal-processing unit can be reduced without the filtering of the evaluation signal being impaired. The oversampling provided according to the invention allows simple analog filters and, moreover, improves the signal-to-noise ratio. As a result, converters with only 10 bits or 12 bits, as are implemented in conventional microcontrollers, can also be used. The function of the analog filters is thereby limited to possible anti-aliasing in the evaluation signal during digitization, and to adaptation of the analog evaluation signal to the dynamic range of the analog/digital converter.

The additional digital filtering thus makes it possible to construct the analog filters and the analog/digital converter with a very low level of complexity. For example, it is possible for the first analog-high pass to be designed as only a first-order filter. The analog low-pass filter can be designed, for example, as an at most fourth-order filter, and/or the analog/digital converter can be designed with a maximum of 12 bits. This reduces the space required and the costs of the analog components. In addition, the temperature dependence of the distance measuring device is reduced. Nevertheless, the potentially high distance resolution is retained.

In order to set the high attenuation of over 80 dB in the evaluation signal, the low-pass filter can be designed, for example, as an FIR filter with a decimator, wherein the decimator is designed, for example, with at least 70 coefficients. The first digital high-pass filter can be designed as an at least second-order filter.

Within the scope of this invention, the term, "oversampling," in relation to the first analog/digital converter is defined such that the Nyquist frequency corresponding to the sampling rate is above the frequency, corresponding to the distance, of the evaluation signal, even at the frequency of the evaluation signal corresponding to the maximum distance to be measured. This is fulfilled when the sampling rate within the scope of the invention is set to at least four times the frequency of the evaluation signal corresponding to the maximum distance to be measured.

With reference to the fill-level measurement device, the term, "unit," within the scope of the invention, is understood in principle to mean any electronic circuit that is suitably designed for the respective intended purpose. Depending upon the requirement, it can therefore be an analog circuit for generating or processing corresponding analog signals. However, it can also be a digital circuit such as a microcontroller or a storage medium in interaction with a program. In this case, the program is designed to perform the corresponding method steps or to apply the necessary calculation operations of the respective unit. In this context, different electronic units of the fill-level measuring device in the sense of the invention can potentially also access a common physical memory or be operated by means of the same physical digital circuit.

The distance measuring device can, advantageously, be developed by designing the signal-generating unit differentially. In this case, it is either necessary for at least the first analog signal-processing unit to be able to process the differential evaluation signals, or for a second, structurally-identical signal-processing unit to be arranged parallel to the first analog signal-processing unit. In both cases, the digital signal-processing unit must be designed for the differential evaluation signals. Accordingly, the first analog/digital converter must also be designed differentially. For reasons of cost, however, it is advantageous if the digital signal-processing unit comprises a second, grounded analog/digital converter which is arranged parallel to the first grounded analog/digital converter and is synchronized with this. Downstream of the first analog/digital converter or the two analog/digital converters, the differential evaluation signal is combined at a summation point by means of subtraction, and processed further as a non-differential evaluation signal.

An advantage of differential design is reduced quantization noise and higher resistance of the measuring device to electromagnetic interference, also known under the acronym, EMC (or "electromagnetic compatibility").

In a further variant of the distance measuring device according to the invention, the signal-generating unit can also be designed so as to generate the evaluation signal as a two-phase signal with a phase shift of 90° with respect to one another. In this variant, the following components must be added to the distance measuring device to process the second phase:
  a second analog signal-processing unit for the second phase of the evaluation signal, having
    a second analog high-pass filter,
    a second amplifier, and
    a second analog low-pass filter.

In this case, the digital evaluation unit must comprise the following, in correspondence with the original components, for the second phase of the evaluation signal:
  a second analog/digital converter,
  a second decimator, and
  a second digital high-pass filter.

The advantage of this is that the computing unit can subject the two phases of the evaluation signal to a Fast Fourier transform in a quasi-complex-valued manner, as a result of which the sensitivity of the distance measurement is increased in turn.

According to the aim of the invention, it is especially expedient to use the distance measuring device according to the invention in accordance with one of the above-described variants as a fill-level measuring device or else as a dielectric value measuring device. Analogously to the distance measuring device according to the invention, the aim of the invention is also achieved by methods for operating the measuring device according to one of the above-described variants. Accordingly, the method comprises the following method steps:
  generating a radio-frequency electrical signal frequency-modulated according to the FMCW principle,
  emitting the radio-frequency signal as radar signal in the direction of the object,
  receiving the reflected radar signal as an electrical received signal after reflection on the object,
  generating an evaluation signal by mixing the received signal with the radio-frequency signal,
  amplifying and filtering the analog evaluation signal, wherein at least the frequency, corresponding to the distance, of the evaluation signal is allowed to pass,
  digitizing the evaluation signal by means of oversampling,
  filtering and optionally decimating the digitized evaluation signal, wherein, in turn, at least the frequency corresponding to the distance in the evaluation signal is allowed to pass, and determining the distance or the dielectric value on the basis of the digitized and filtered evaluation signal—for example, by means of a (Fast) Fourier transform.

BRIEF DESCRIPTION OF THE DRAWINGS

The invention is explained in more detail with reference to the following figures. The following are shown.

DETAILED DESCRIPTION

Figure 1:
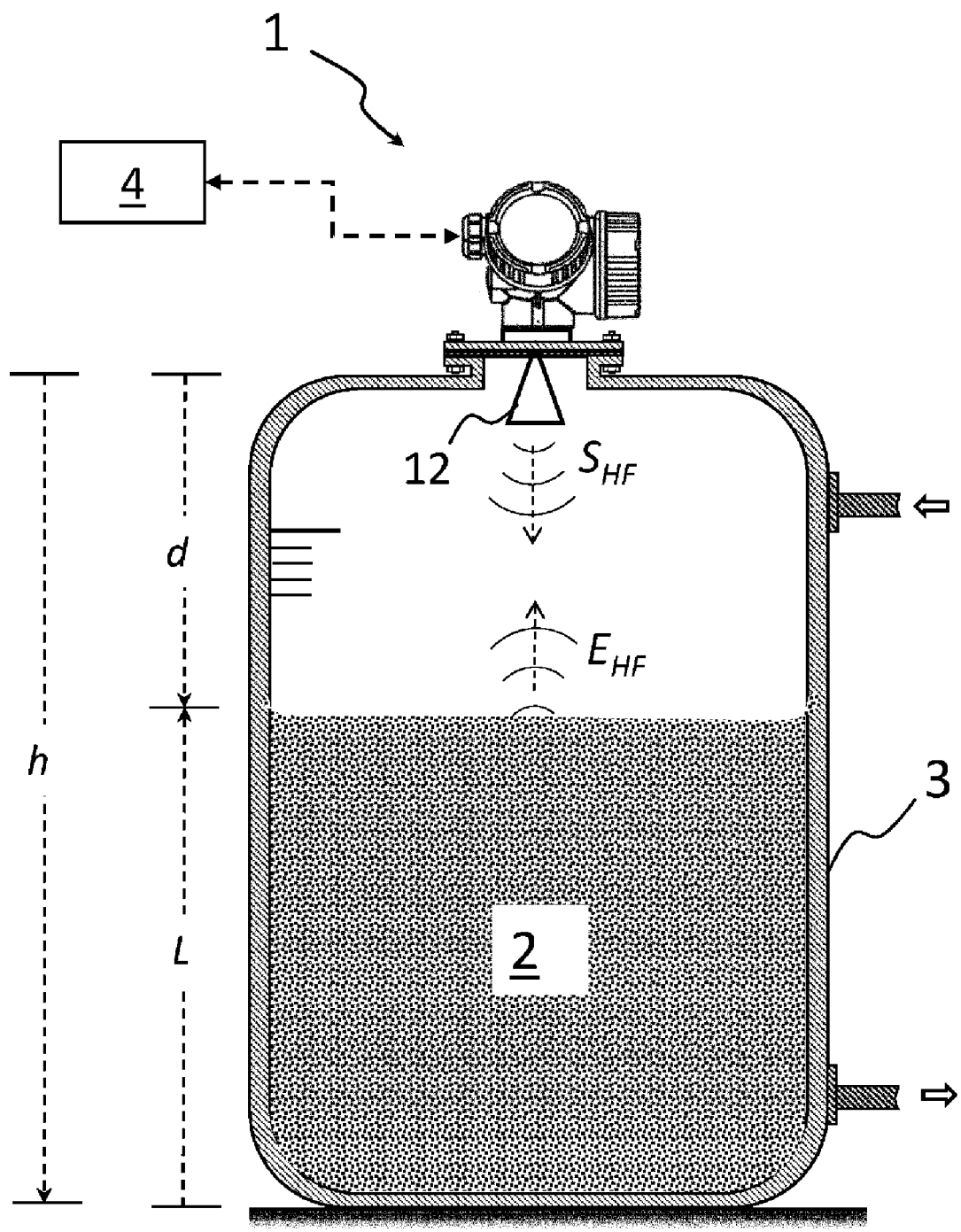
FIG. 1 shows a typical arrangement of a radar-based, fill-level measuring device on a container.

For a basic understanding of the invention, FIG. 1 shows a typical arrangement of a freely-radiating, radar-based, fill-level measuring device 1 on a container 3. In the container 3 is a filling material 2, the fill-level L of which is to be determined by the fill-level measuring device 1. For this purpose, the fill-level measuring device 1 is mounted on the container 3 above the maximum permissible fill-level L. Depending upon the field of application, the height h of the container 3 can be between 30 cm and 125 m.

As a rule, the fill-level measurement device 1 is connected via a bus system, such as "Ethernet," "PROFIBUS," "HART," or "Wireless HART," to a higher-level unit 4, such as a process control system or a decentralized database. Information about the operating state of the fill-level measuring device 1 can be communicated thereby. On the other hand, information about the fill-level L can also be transmitted via the bus system, in order to control any inflows or outflows that may be present at the container 3.

Since the fill-level measuring device 1 shown in FIG. 1 is designed as a freely-radiating radar measuring device, it comprises a corresponding transmitting/receiving antenna 12. As indicated, the antenna 12 can be designed as a horn antenna, for example. Regardless of the design, the transmitting/receiving antenna 12 is oriented in such a way that a corresponding radar signal $S_{HF}$ is emitted in the direction of the filling material 3 according to the FMCW principle. The radar signal $S_{HF}$ is reflected at the surface of the filling material 3 and, after a corresponding signal propagation delay, is accordingly received as an electrical received signal $e_{HF}$ by the transmitting/receiving antenna 12. The signal propagation delay of the radar signal $S_{HF}$, $E_{HF}$ depends upon the distance d=h−L of the fill-level measuring device 1 from the filling material surface.

In contrast to the variant shown, it is also possible for two separate antennas to be used for separate transmission and reception of the radar signal $S_{HF}$, $E_{HF}$, instead of a single transmitting/receiving antenna 12. A further alternative consists in using an electrically-conductive probe, such as a waveguide or a coaxial cable, which extends towards the container bottom. This variant is known by the term, "guided radar." In the case of guided radar, it is also possible by means of the measuring device 1 to determine the dielectric value of the fill material 2, additionally or alternatively to the distance d or the fill-level L, from the received signal $e_{HF}$.

Figure 2:
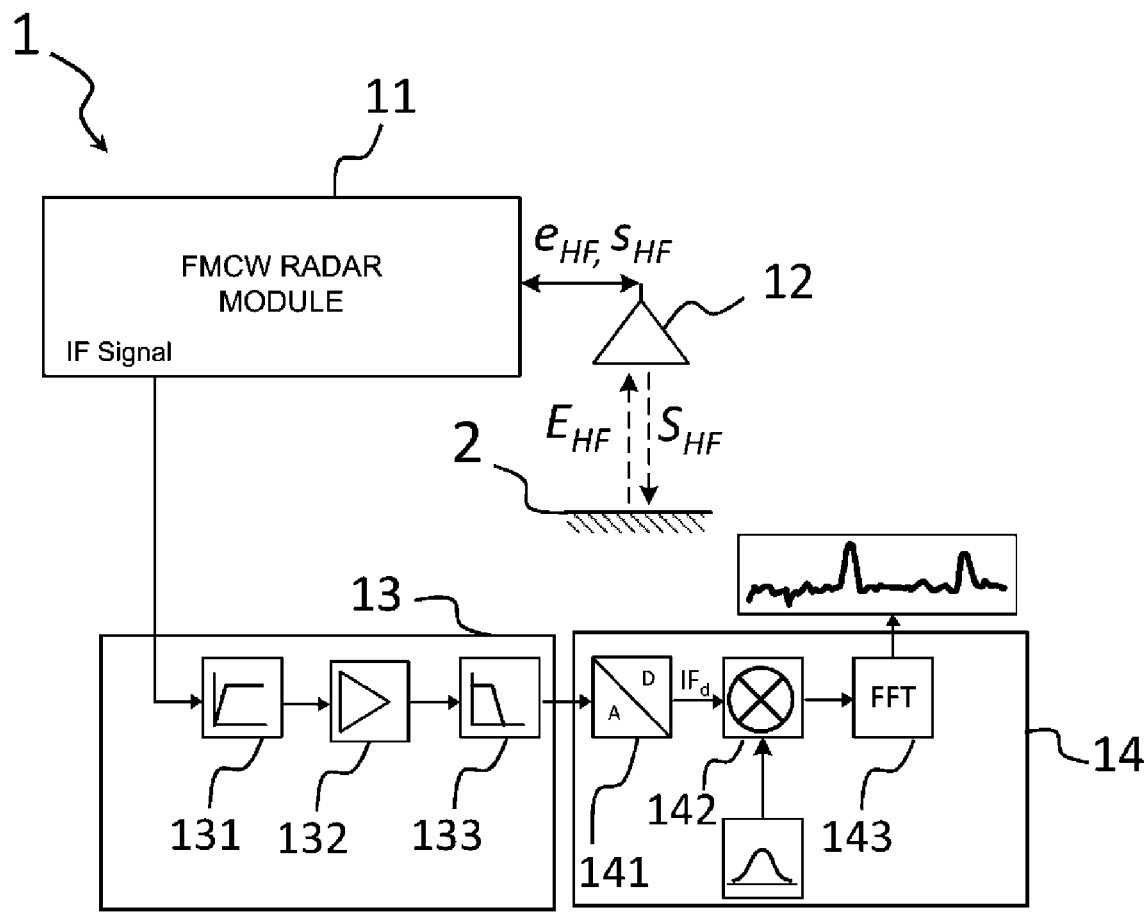
FIG. 2 shows a circuit design of an FMCW radar-based distance measuring device according to the prior art.

The basic circuit design of a known fill-level measuring device 1 operating according to the FMCW method is illustrated in FIG. 2: To generate the radar signal $S_{HF}$, the measuring device 1 comprises a signal-generating unit 11, which generates a corresponding radio-frequency electrical signal $s_{HF}$ and supplies it to the antenna 12. The frequency of the radio-frequency signal $s_{HF}$ defines the frequency of the radar signal $S_{HF}$ in the microwave range. Therefore, the radio-frequency signal-generating unit 11, 12 must be designed to generate the radio-frequency electric signal $s_{HF}$ with the ramp-shaped frequency change required in FMCW:

In the case of a ramp-shaped frequency change according to the FMCW principle, the frequency f increases in a periodically repeating manner within a predefined frequency band Δf with a constant rate of change. The periodicity of the individual frequency ramps can be within a range of a some 100 ms. The duration of the individual ramp can be within the range between 100 μs and 100 ms. The position of the frequency band Δf must be set taking into account regulatory requirements, for which reason the ISM bands at 6 GHz, 26 GHz, 79 GHz, or 120 GHz are preferably implemented as the frequency band Δf. The bandwidth lies in particular between 0.5 GHz and 10 GHz, depending upon the position of the frequency band Δf.

Figure 3:
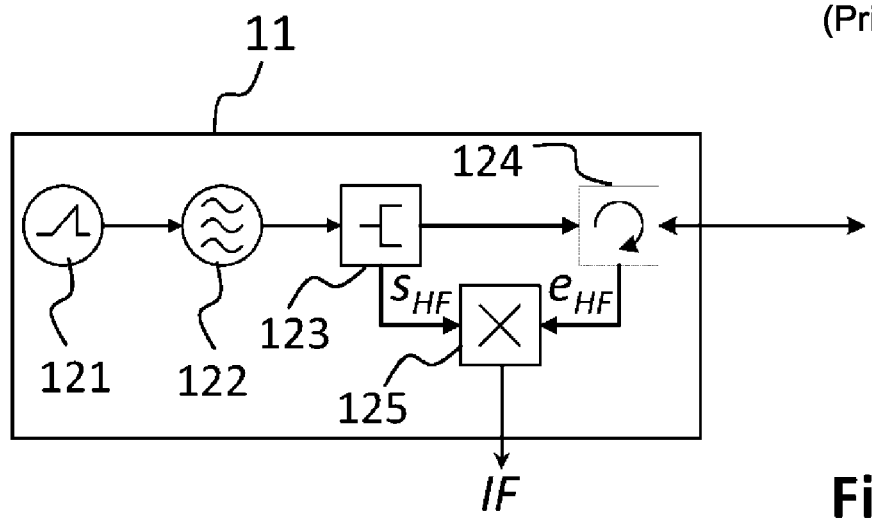
FIG. 3 shows a typical signal-generating unit for FMCW radar.

As shown in detail in FIG. 3, the signal-generating unit 11 comprises a radio-frequency oscillator 122, which is regulated by means of a ramp generation unit 121, for the generation of the radio-frequency signal $s_{HF}$. The regulation takes place in the form of a phase control (known as "phase locked loop, PLL"). Thus, the frequency f of the radio-frequency oscillator 122 is stabilized, on the one hand, against fluctuations in the ambient temperature. On the other hand, the ramp-shaped frequency change of the radio-frequency signal $s_{HF}$ is set thereby.

According to the signal-generating unit 11 in FIG. 3, the radio-frequency electrical signal $s_{HF}$ is supplied via a signal divider 123 and a transmitting/receiving switch 124 to the antenna 12 for emission.

The incoming radar signal $E_{HF}$ which is reflected by the filling material surface is converted back into a purely electrical received signal $e_{HF}$ by the transmitting/receiving antenna 12 and, optionally, amplified by a receiving amplifier of the signal-generating unit 11 (not shown in FIG. 3). The received signal $e_{HF}$ is then, by means of a mixer 125, mixed with the radio-frequency signal $s_{HF}$ to be emitted, wherein the radio-frequency signal $s_{HF}$ is branched off from the signal divider 123 for this purpose. This generates an evaluation signal IF, typical in the FMCW method, which forms the basis for determining the distanced or the fill-level L. In this case, the frequency of the evaluation signal IF according to the FMCW principle is proportional to the distance d.

FIG. 2 clearly shows that the frequency of the evaluation signal IF is determined by a digital evaluation unit 14 of the distance measuring device 1. For this purpose, a first analog/digital converter 141 of the evaluation unit 14 digitizes the evaluation signal IF. To comply with the sampling theorem, the first analog/digital converter 141 samples at somewhat more than twice the frequency, corresponding to the distance d, of the evaluation signal IF. Thus, a correspondingly-designed computing unit 143 of the evaluation unit 14 can subject the digitized evaluation signal to a (Fast) Fourier transform, or FFT for short. The frequency of the global maximum of the corresponding FFT spectrum ideally corresponds to the distance d. To suppress any undesired secondary maxima, which arise due to the finite length of the evaluation signal IF, the evaluation unit 14 subjects the digitized evaluation signal $IF_d$ to a first windowing 142 prior to the Fourier transform.

As shown in FIG. 2, a first analog signal-processing unit 13 for filtering the analog evaluation signal IF is connected upstream of the digital evaluation unit 14. First, the analog evaluation signal IF is subjected here to an analog high-pass filtering 131 in order, primarily, to suppress so-called low-frequency "ringing" from the near range. For example, a first-order high-pass filter 131, i.e., a single capacitor, can be used as the analog filter here. Another advantage of using the first analog high-pass filter is that the analog/digital converter 141 can be designed with low dynamics, e.g., with a maximum of 12 bits, as a result. After subsequent signal amplification by means of a corresponding first amplifier 132, a first analog low-pass filter 133 of the first analog signal-processing unit 13 filters the evaluation signal IF. On the one hand, this counteracts the aliasing effect during subsequent digitization of the evaluation signal IF. Above all, however, the first analog low-pass filter 133 has to be designed with a high order of, for example, at least 8, so that all frequencies above the frequency, corresponding to the distance d, of the evaluation signal IF are suppressed as far as possible. The impedances or capacitances of the first analog low-pass filter 133, which are necessary for implementing the high order, however, result in a high temperature dependence and a high tolerance dependence during the filtering. Furthermore, the implementation of the first analog low-pass filter 133 with a high order is very cost-intensive. The transient recovery time, and thus the required minimum measurement time, also increase with increasing order.

Figure 4:
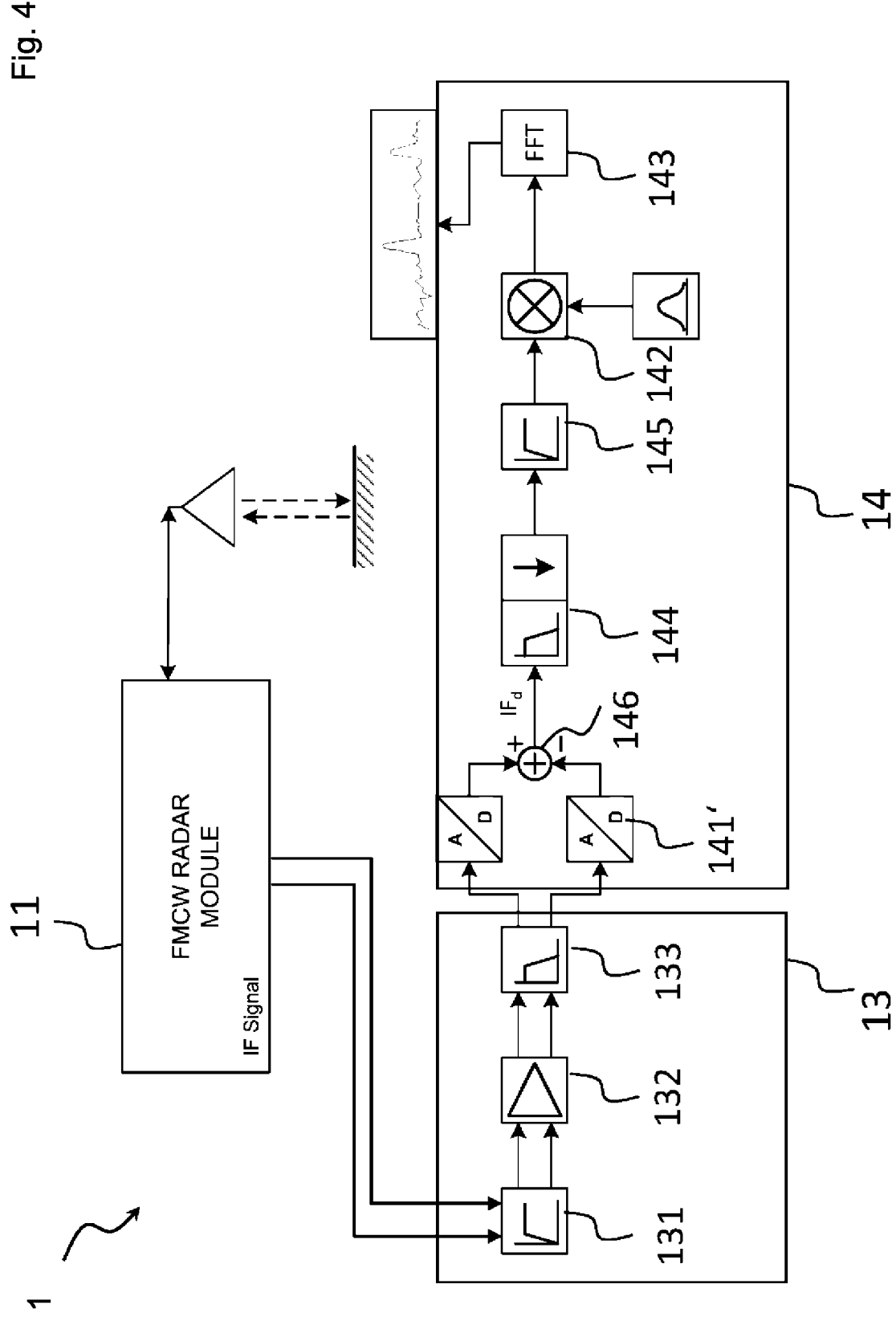
FIG. 4 shows a circuit design of a possible variant of the distance measuring device according to present disclosure.

An FMCW-based distance measuring device 1 according to the invention, which requires only an analog low-pass filter 133 of low order, e.g., third order, is described in more detail in FIG. 4: In comparison with the measuring device 1 shown in FIG. 2, it is additionally based upon a first decimator 144 in the digital evaluation unit 14, which, on the one hand, carries out a digital low-pass filtering and at the same time decimates the data rate of the digitized evaluation signal $IF_d$. In this case, the first analog low-pass filter 133 ensures the anti-aliasing during digitization of the evaluation signal IF, while the first decimator 144 filters out all the frequencies above the frequency, corresponding to the maximum distance d, of the evaluation signal IF. To use the frequencies $f_{IF}$ up to the Nyquist frequency of the reduced sampling rate, it is, accordingly, advantageous to design the decimator 144 with at least 70 coefficients.

In the variant of the fill-level measuring device 1 according to the invention shown in FIG. 4, a first digital high-pass filter 145 is additionally arranged in the signal path of the digitized evaluation signal $IF_d$ downstream of the first decimator 144 in the digital evaluation unit 14. This is used, in correspondence with the first analog high-pass filter 131, to filter low-frequency components $f_{IF}$ in the evaluation signal $IF_d$, which are caused by device-internal reflections in RF components, such as the antenna 12. The design as a digital high-pass filter 145 with a variable order (at least second order) and adjustable limit frequency is advantageous here.

So that the first analog low pass filter 133 can also prevent any aliasing of the first analog/digital converter 141 despite a low order, it is essential in the context of the invention that the first analog/digital converter 141 digitize the evaluation signal IF, with respect to the frequency corresponding to the distanced of the object 3, by means of oversampling. This means that the sampling rate r of the analog/digital converter 141 necessarily, i.e., even at that frequency $f_{IF}$ of the evaluation signal IF which corresponds to the maximum distance d to be measured, according to $$r > 2 * f_{IF},$$

lies above the frequency $f_{IF}$, corresponding to the distance, of the evaluation signal IF. As a result, the alias components in the digitized evaluation signal $IF_d$ are suppressed until they are below the resolution limit, after filtering in the decimator 144.

The signal-generating unit 11 of the variant shown in FIG. 4 is designed to output the evaluation signal IF differentially. Corresponding to this, the first analog high-pass filter 131, the first amplifier 132, and the first analog-low pass filter 133 of the first analog signal-processing unit 13 are likewise designed differentially in the variant shown in FIG. 4. The digital evaluation unit 14 is also designed to process the evaluation signal IF differentially. For this purpose, the digital evaluation unit 14 comprises a second analog/digital converter 141' parallel to the first analog/digital converter 141, wherein the two converters 141, 141' are ground-referenced and synchronized with one another, and digitize the respective phase of the evaluation signal IF. Downstream of the analog/digital converters 141, 141', the two components of the evaluation signal IF are combined at a summation point 146 by means of subtraction. An advantage of a differential design is that the analog/digital conversion is additionally carried out with virtually one bit, whereby the quantization noise is reduced. This increases the sensitivity of the distance measurement. It is therefore possible to detect objects 2 that are farther away or poorly reflective.

Figure 5:
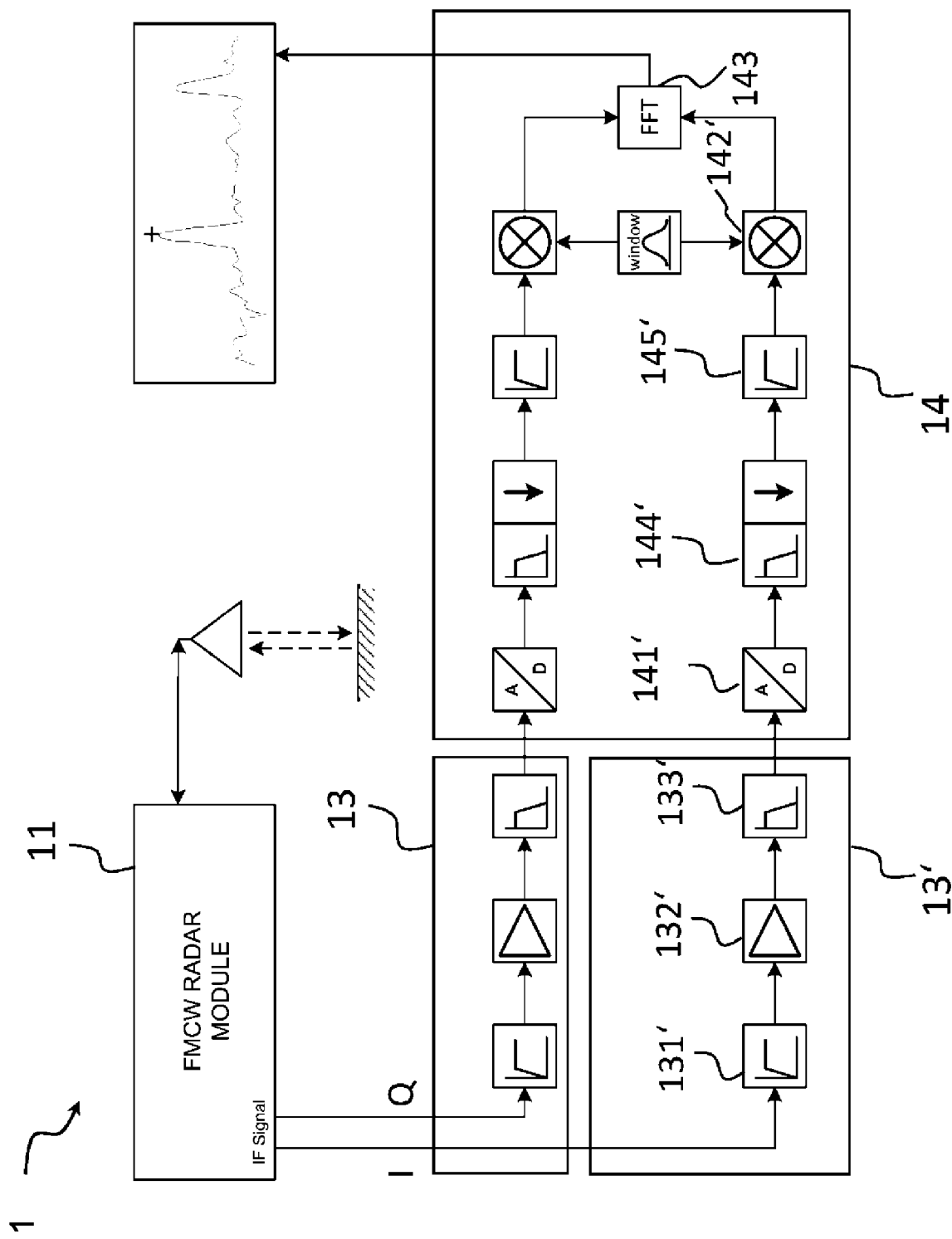
FIG. 5 shows a circuit design of a further variant of the distance measuring device according to the present disclosure.

A further expanded variant of the distance measuring device 1 is shown in FIG. 5: In this variant, the signal-generating unit 11 is designed to output the evaluation signal IF with two phases I, Q with a phase shift of 90° with respect to one another. For this purpose, the signal-generating unit 11 comprises a quadrature demodulator, which outputs the evaluation signal IF as so-called I and Q components with a 90° phase shift with respect to one another. To process the second phase Q, the distance measuring device 1 in this case comprises a second signal-processing unit 13', so that the so-called I phase and the Q phase of the evaluation signal IF are each supplied separately to one of the two signal-processing units 13, 13'. As can be seen in FIG. 5, the digital evaluation unit 14 in this case comprises a second analog/digital converter 141', a second decimator 144', a second digital high-pass filter 145', and a second windowing 142' for the additional Q phase of the evaluation signal IF. The two phases I, Q of the digitized evaluation signal $IF_d$ are combined in the computing unit 143, wherein the Fast Fourier transform in this case is performed in a correspondingly complex-valued manner. The advantage of this complex-valued evaluation is that the sensitivity of the distance measurement is in turn increased by approximately 3 dB thereby.

In the case of a two-phase design of the signal-generating unit 11, the latter can also be designed such that each of the phases I, Q shifted by 90° is output differentially in turn. In this case, the analog signal-processing units 13, 13 and the digital signal-processing unit 14 are in turn correspondingly designed differentially, as explained in connection with FIG. 4.

It is self-evident that the measuring device 1 described in connection with fill-level measurement can of course also be used in general for distance measurement. If the measuring device 1 is implemented on the basis of guided radar, i.e., if the antenna 12 is designed as a probe immersed in the filling material 2 (not shown in FIG. 1), the measuring device 1 can also be used to determine the dielectric value of the filling material 2. In this case, the dielectric value can in turn be determined by means of the digital evaluation signal $IF_d$, since the probe length is known or constant.

The invention claimed is:

1. A frequency modulated continuous wave (FMCW) radar-based distance measuring device for measuring a distance from an object, comprising:
   a signal-generating unit configured to generate an electrical radio-frequency signal according to the FMCW principle and to generate an evaluation signal by mixing the radio-frequency signal with a received signal;
   an antenna arrangement via which the radio-frequency signal can be emitted as a radar signal in a direction of the object and can be received as a corresponding received signal after reflection on the object;
   a first analog signal-processing unit for processing the evaluation signal, including, each arranged in series:
      a first analog high-pass filter that is designed as a first-order filter;
      a first amplifier; and
      a first analog low-pass filter that is designed as an at most fourth-order filter; and
   a digital evaluation unit for processing the evaluation signal, wherein the digital evaluation unit is arranged downstream of the first analog signal-processing unit, the digital evaluation unit including:
      a first analog/digital converter designed to digitize the evaluation signal processed by the first analog signal-processing unit via oversampling;
      a first digital low-pass filter for filtering the evaluation signal;
      a first digital high-pass filter for filtering the evaluation signal; and
      a computing unit configured to determine the distance on the basis of the filtered digital evaluation signal using a Fourier transform.

2. The distance measuring device according to claim 1, wherein the first digital low-pass filter is designed as a finite impulse response (FIR) filter with an integrated decimator, wherein the decimator is designed with at least 50 coefficients, and/or
   wherein the first digital high-pass filter is designed as an at least second-order filter.

3. The distance measuring device according to claim 1, wherein the first analog/digital converter is designed with a maximum of 12 bits.

4. The distance measuring device according to claim 1, wherein the signal-generating unit is designed to output the evaluation signal differentially.

5. The distance measuring device according to claim 4, wherein at least the first analog signal-processing unit is designed to process the evaluation signal differentially, and wherein the digital signal-processing unit includes a second analog/digital converter.

6. The distance measuring device according to claim 1, wherein the signal-generating unit is designed to generate the evaluation signal as a two-phase signal with a phase shift of 90° with respect to one another, the distance measuring device further comprising:
   a second analog signal-processing unit for the second phase of the evaluation signal, including:
      a second analog high-pass filter;
      a second amplifier; and
      a second analog low-pass filter,
   wherein the digital evaluation unit for the second phase of the evaluation signal further includes:
      a second analog/digital converter;
      a second decimator; and
      a second digital high-pass filter.

7. A method for frequency modulated continuous wave (FMCW) radar-based measurement of a distance from an object using a distance measuring device, comprising:
   providing the FMCW distance measuring device, including:
      a signal-generating unit configured to generate an electrical radio-frequency signal according to the FMCW principle and to generate an evaluation signal by mixing the radio-frequency signal with a received signal;
      an antenna arrangement via which the radio-frequency signal can be emitted as a radar signal in a direction of the object and can be received as a corresponding received signal after reflection on the object;
      a first analog signal-processing unit for processing the evaluation signal, including, each arranged in series:
         a first analog high-pass filter that is designed as a first-order filter;
         a first amplifier; and
         a first analog low-pass filter that is designed as an at most fourth-order filter; and
      a digital evaluation unit for processing the evaluation signal, wherein the digital evaluation unit is arranged downstream of the first analog signal-processing unit, the digital evaluation unit including:
         a first analog/digital converter designed to digitize the evaluation signal processed by the first analog signal-processing unit via oversampling;
         a first digital low-pass filter for filtering the evaluation signal;
         a first digital high-pass filter for filtering the evaluation signal; and
         a computing unit configured to determine the distance on the basis of the filtered digital evaluation signal using a Fourier transform;
   generating a radio-frequency electrical signal frequency-modulated according to the FMCW principle;
   emitting the radio-frequency signal as a radar signal in the direction of the object;
   receiving the reflected radar signal as an electrical received signal after reflection on the object;
   generating an evaluation signal by mixing the received signal with the radio-frequency signal;
   amplifying and filtering the analog evaluation signal, wherein at least the frequency, corresponding to the distance, of the evaluation signal is allowed to pass;
   digitizing the evaluation signal at a sampling rate which is at least four times higher than the frequency, corresponding to the distance, of the evaluation signal (IF);
   filtering and compressing the digitized evaluation signal; and
   determining the distance on the basis of the digitized evaluation signal using a Fast Fourier transform.

8. A fill-level measuring device, comprising:
   a frequency modulated continuous wave (FMCW) radar-based distance measuring device for measuring a distance from an object, including:
      a signal-generating unit configured to generate an electrical radio-frequency signal according to the FMCW principle and to generate an evaluation signal by mixing the radio- frequency signal with a received signal;
      an antenna arrangement via which the radio-frequency signal can be emitted as a radar signal in a direction of the object and can be received as a corresponding received signal after reflection on the object;
a first analog signal-processing unit for processing the evaluation signal, including, each arranged in series:
  a first analog high-pass filter that is designed as a first-order filter;
  a first amplifier; and
  a first analog low-pass filter that is designed as an at most fourth-order filter; and
a digital evaluation unit for processing the evaluation signal, wherein the digital evaluation unit is arranged downstream of the first analog signal-processing unit, the digital evaluation unit including:
a first analog/digital converter designed to digitize the evaluation signal processed by the first analog signal-processing unit via oversampling;
  a first digital low-pass filter for filtering the evaluation signal;
  a first digital high-pass filter for filtering the evaluation signal; and
  a computing unit configured to determine the distance on the basis of the filtered digital evaluation signal using a Fourier transform.

9. A dielectric value measuring device, comprising:
a frequency modulated continuous wave (FMCW) radar-based distance measuring device for measuring a distance from an object, including:
  a signal-generating unit configured to generate an electrical radio-frequency signal according to the FMCW principle and to generate an evaluation signal by mixing the radio-frequency signal with a received signal;
  an antenna arrangement via which the radio-frequency signal can be emitted as a radar signal in a direction of the object and can be received as a corresponding received signal after reflection on the object;
  a first analog signal-processing unit for processing the evaluation signal, including, each arranged in series:
    a first analog high-pass filter that is designed as a first-order filter;
    a first amplifier; and
    a first analog low-pass filter that is designed as an at most fourth-order filter; and
  a digital evaluation unit for processing the evaluation signal, wherein the digital evaluation unit is arranged downstream of the first analog signal-processing unit, the digital evaluation unit including:
    a first analog/digital converter designed to digitize the evaluation signal processed by the first analog signal-processing unit via oversampling;
    a first digital low-pass filter for filtering the evaluation signal;
    a first digital high-pass filter for filtering the evaluation signal; and
    a computing unit configured to determine the distance on the basis of the filtered digital evaluation signal using a Fourier transform.

\* \* \* \* \*